US012423263B2

(12) United States Patent
Huang et al.

(10) Patent No.: US 12,423,263 B2
(45) Date of Patent: Sep. 23, 2025

(54) DUAL SYSTEM SERVER

(71) Applicants: SQ TECHNOLOGY(SHANGHAI) CORPORATION, Shanghai (CN); INVENTEC CORPORATION, Taipei (TW)

(72) Inventors: Li-Hong Huang, Shanghai (CN); Muxin Wang, Shanghai (CN); Hong-Chou Lin, Taipei (TW); Yu-Fan Chen, Taipei (TW)

(73) Assignees: SQ TECHNOLOGY(SHANGHAI) CORPORATION, Shanghai (CN); INVENTEC CORPORATION, Taipei (TW)

( * ) Notice: Subject to any disclaimer, the term of this patent is extended or adjusted under 35 U.S.C. 154(b) by 87 days.

(21) Appl. No.: 18/535,922

(22) Filed: Dec. 11, 2023

(65) Prior Publication Data
US 2025/0156368 A1  May 15, 2025

(30) Foreign Application Priority Data
Nov. 10, 2023 (CN) .......................... 202311501867.0

(51) Int. Cl.
*G06F 15/78* (2006.01)
*G06F 13/42* (2006.01)

(52) U.S. Cl.
CPC .......... *G06F 15/78* (2013.01); *G06F 13/4282* (2013.01); *G06F 2213/0026* (2013.01)

(58) Field of Classification Search
CPC ................. G06F 15/78; G06F 13/4282; G06F 2213/0026; G06F 15/163; G06F 13/4068
See application file for complete search history.

(56) References Cited

U.S. PATENT DOCUMENTS

| | | | |
|---|---|---|---|
| 10,521,376 B1 * | 12/2019 | Mitra | G06F 3/0632 |
| 10,572,403 B1 * | 2/2020 | Zhan | G06F 13/1668 |
| 10,585,816 B1 * | 3/2020 | Lambert | G06F 13/122 |
| 2017/0364375 A1 * | 12/2017 | Ku | G06F 9/44505 |
| 2020/0182932 A1 * | 6/2020 | Wang | G01R 31/31715 |
| 2020/0263696 A1 * | 8/2020 | Hsu | F04D 27/007 |
| 2020/0341926 A1 * | 10/2020 | Tu | G06F 3/0632 |
| 2021/0081214 A1 * | 3/2021 | Lambert | G06F 9/4411 |
| 2021/0089106 A1 * | 3/2021 | Muccini | G06F 1/30 |
| 2021/0109885 A1 * | 4/2021 | Guo | G06F 1/04 |
| 2022/0414045 A1 * | 12/2022 | Yang | G06F 13/4282 |
| 2023/0074345 A1 * | 3/2023 | Lambert | G06F 8/65 |
| 2023/0122697 A1 * | 4/2023 | Maddukuri | G06F 1/206 |

(Continued)

*Primary Examiner* — Faisal M Zaman
(74) *Attorney, Agent, or Firm* — Maschoff Brennan

(57) ABSTRACT

A dual system server includes: a central processing unit, a first baseboard management controller, a second baseboard management controller and a complex programmable logic device. The first baseboard management controller is connected to the central processing unit through a first peripheral component interconnect express interface. The second baseboard management controller is connected to the central processing unit through a second peripheral component interconnect express interface. The complex programmable logic device is connected to the first baseboard management controller through a first inter-integrated circuit interface, and is connected to the second baseboard management controller through a second inter-integrated circuit interface.

9 Claims, 6 Drawing Sheets

(56) References Cited

U.S. PATENT DOCUMENTS

| | | | |
|---|---|---|---|
| 2023/0229132 A1* | 7/2023 | Heinrich | G05B 19/045 700/282 |
| 2024/0126356 A1* | 4/2024 | Zhang | G06F 1/30 |

\* cited by examiner

DUAL SYSTEM SERVER

CROSS-REFERENCE TO RELATED APPLICATIONS

This non-provisional application claims priority under 35 U.S.C. § 119 (a) on Patent Application No(s). 202311501867.0 filed in China on Nov. 10, 2023, the entire contents of which are hereby incorporated by reference.

BACKGROUND

1. Technical Field

This disclosure relates to a dual system server.

2. Related Art

Currently, most servers adopt dual sockets, and the two sockets are connected by an ultra path interconnect (UPI). However, the cost of this structure is high, and it is easy for the entire system to fail to function properly if one of the sockets fails to operate normally.

SUMMARY

Accordingly, this disclosure provides a dual system server.

According to one or more embodiment of this disclosure, a dual system server includes: a central processing unit, a first baseboard management controller, a second baseboard management controller and a complex programmable logic device. The first baseboard management controller is connected to the central processing unit through a first peripheral component interconnect express interface. The second baseboard management controller is connected to the central processing unit through a second peripheral component interconnect express interface. The complex programmable logic device is connected to the first baseboard management controller through a first inter-integrated circuit interface, and is connected to the second baseboard management controller through a second inter-integrated circuit interface.

In view of the above description, the dual system server according to one or more embodiments of the present disclosure may implement the structure of have two one-socket (1S) servers on one mainboard, and functions of the dual systems may be compatible with the structure at the same time, thereby reducing the cost of the server.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
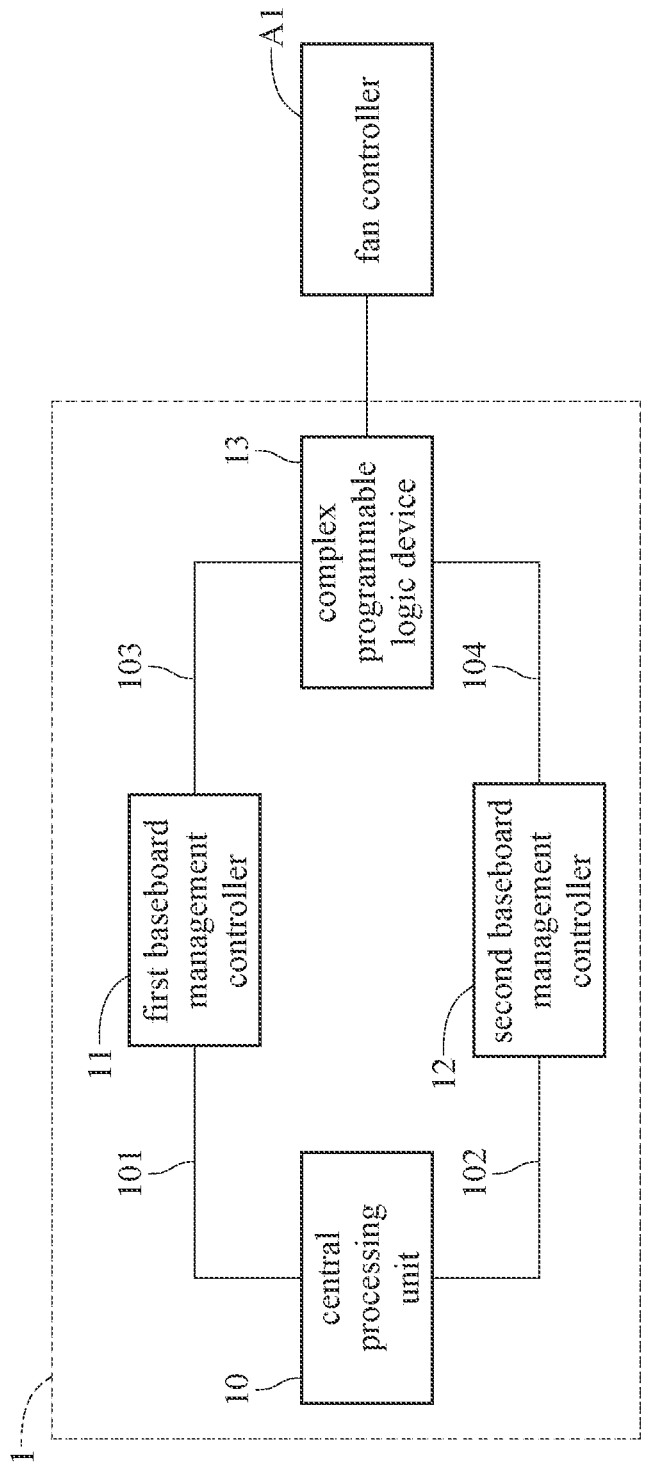
FIG. 1 is a block diagram illustrating a dual system server according to a first embodiment of the present disclosure.

Please refer to FIG. 1, wherein FIG. 1 is a block diagram illustrating a dual system server according to a first embodiment of the present disclosure. As shown in FIG. 1, the dual system server 1 includes a central processing unit 10, a first baseboard management controller 11, a second baseboard management controller 12 and a complex programmable logic device 13.

The first baseboard management controller 11 is connected to the central processing unit 10 through a first peripheral component interconnect express (PCIe) interface 101. The second baseboard management controller 12 is connected to the central processing unit 10 through a second PCIe interface 102. The complex programmable logic device 13 is connected to the first baseboard management controller 11 through a first inter-integrated circuit (I2C) interface 10, and connected to the second baseboard management controller 12 through a second I2C interface 104.

The first baseboard management controller 11 and the second baseboard management controller 12 are preferably baseboard management controllers of the same model. In the structure of FIG. 1, the first baseboard management controller 11 and the second baseboard management controller 12 may read the central processing unit 10, respectively. Through the structure of FIG. 1, the structure of having two one-socket (1S) servers on one mainboard may be implemented, and functions of the dual systems may be compatible with the structure at the same time, thereby reducing the cost of the server.

The complex programmable logic device 13 is further connected to a fan controller A1. The complex programmable logic device 13 may include a plurality of registers configured to store pulse width modulation values of the fan. The complex programmable logic device 13 may determine a maximum speed of the fan based on the pulse width modulation values stored in the registers. In addition, the complex programmable logic device 13 may control the fan to operate at a safe speed when any one of the first I2C interface 103 and the second I2C interface 104 is unreadable. In other words, the complex programmable logic device 13 may detect the first I2C interface 103 and the second I2C interface 104, and when the complex programmable logic device 13 is unable to detect any one of the first I2C interface 103 and the second I2C interface 104, it might mean that the corresponding baseboard management controller is lost (disconnected). Therefore, the complex programmable logic device 13 may output the safe speed to the fan controller A1 to control the fan to operate at the safe speed. Accordingly, the system fan may be made sure to operate normally and the situation of false hangs due to abnormal conditions (for example, high temperature) may be avoided.

Figure 2:
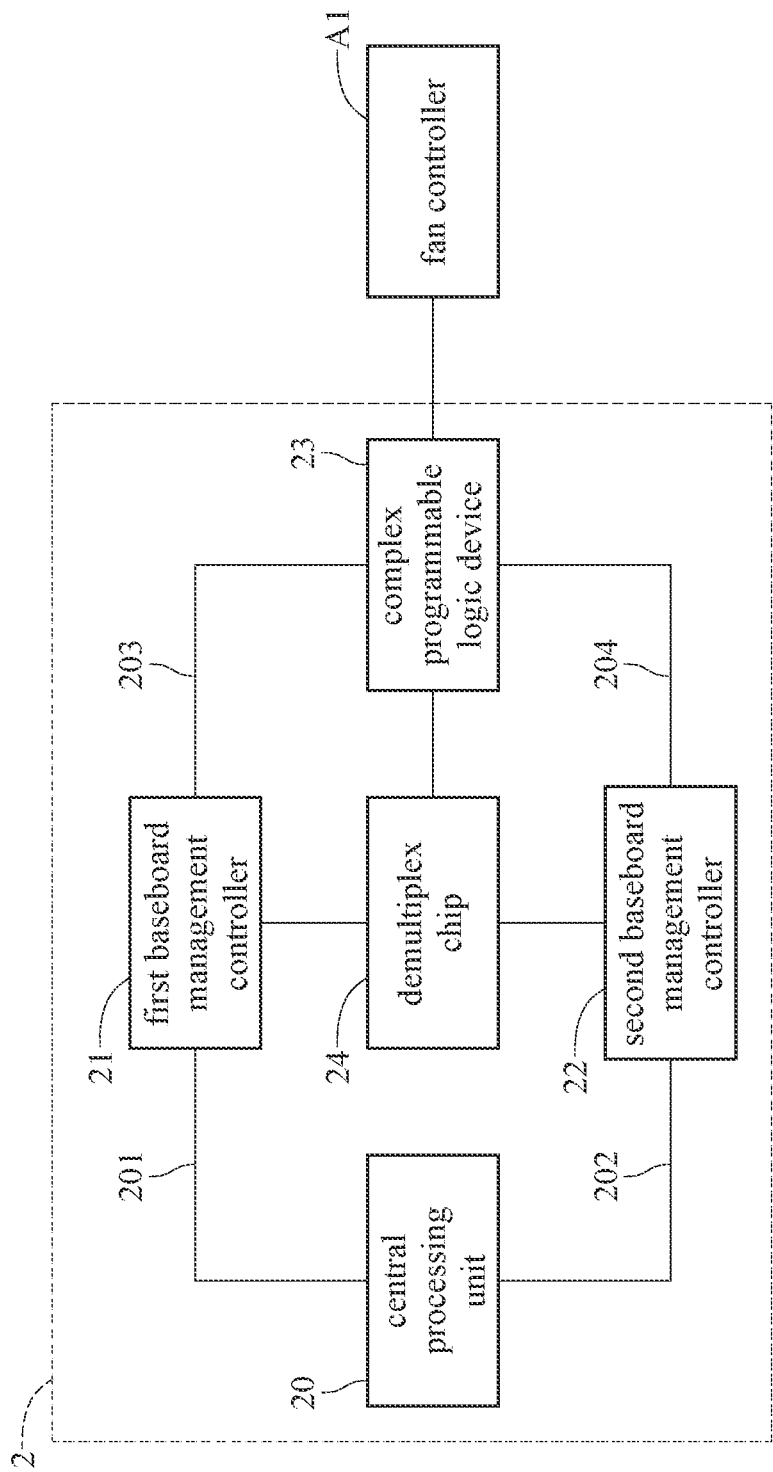
FIG. 2 is a block diagram illustrating a dual system server according to a second embodiment of the present disclosure.

Please refer to FIG. 2, wherein FIG. 2 is a block diagram illustrating a dual system server according to a second embodiment of the present disclosure. As shown in FIG. 2, the dual system server 2 includes a central processing unit 20, a first baseboard management controller 21, a second baseboard management controller 22, a complex programmable logic device 23 and a demultiplex chip 24.

The first baseboard management controller 21 is connected to the central processing unit 20 through the first PCIe interface 201. The second baseboard management controller 22 is connected to the central processing unit 20 through the second PCIe interface 202. The complex programmable logic device 23 is connected to the first baseboard management controller 21 through the first I2C interface 203 and connected to the second baseboard management controller 22 through the second I2C interface 204. The demultiplex chip 24 may be connected to the first baseboard management controller 21, the second baseboard management controller 22 and the complex programmable logic device 23.

The central processing unit 20, the first baseboard management controller 21, the second baseboard management controller 22 and the complex programmable logic device 23 of the dual system server 2 are the same as the central processing unit 10, the first baseboard management controller 11, the second baseboard management controller 12 and the complex programmable logic device 13 of the dual system server 1, respectively, their descriptions are omitted herein.

The demultiplex chip 24 is configured to enable communication of one of the first I2C interface 203 and the second I2C interface 204, and disable communication of the other one of the first I2C interface 203 and the second I2C interface 204. In other words, assuming that the first I2C interface 203 is the interface enabled to communicate, the demultiplex chip 24 may act as an arbitration element for enabling the first I2C interface 203 to perform communication and control the second I2C interface 204 to not perform communication during the communication of the first I2C interface 203. For example, the model of the demultiplex chip 24 may be PCA9641.

Figure 3:
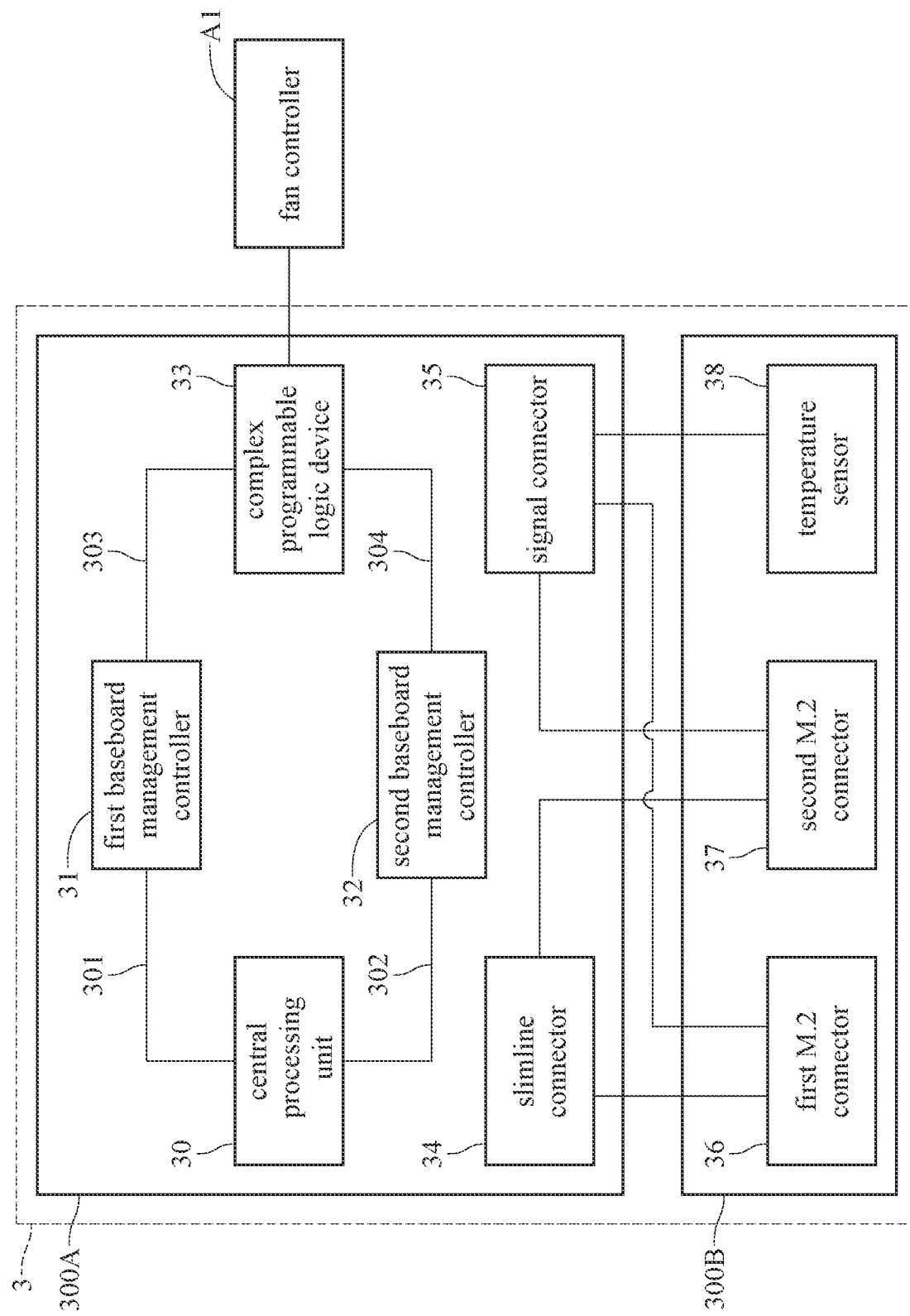
FIG. 3 is a block diagram illustrating a dual system server according to a third embodiment of the present disclosure.

Please refer to FIG. 3, wherein FIG. 3 is a block diagram illustrating a dual system server according to a third embodiment of the present disclosure. As shown in FIG. 3, the dual system server 3 includes a central processing unit 30, a first baseboard management controller 31, a second baseboard management controller 32, a complex programmable logic device 33, a slimline connector 34, a signal connector 35, a first M.2 connector 36 and a second M.2 connector 37 and a temperature sensor 38.

The first baseboard management controller 31 is connected to the central processing unit 30 through the PCIe interface 301. The second baseboard management controller 32 is connected to the central processing unit 30 through the second PCIe interface 302. The complex programmable logic device 33 is connected to the first baseboard management controller 31 through the first I2C interface 303 and connected to the second baseboard management controller 32 through the second I2C interface 304.

The central processing unit 30, the first baseboard management controller 31, the second baseboard management controller 32 and the complex programmable logic device 33 of the dual system server 3 are the same as the central processing unit 10, the first baseboard management controller 11, the second baseboard management controller 12 and the complex programmable logic device 13 of the dual system server 1, respectively, their descriptions are omitted herein.

As shown in FIG. 3, the dual system server 3 further includes a mainboard 300A, and the central processing unit 30, the first baseboard management controller 31, the second baseboard management controller 32, the complex programmable logic device 33, the slimline connector 34 and the signal connector 35 may all be disposed on the mainboard 300A. The slimline connector 34 may be a J3 connector, the signal connector 35 may be a J4 connector and may be a sideband connector on the mainboard 300A. Further, the dual system server 3 may include a M.2 backboard 300B, and include a first M.2 connector 36 and a second M.2 connector 37 disposed on the M.2 backboard 300B.

The M.2 backboard 300B is connected to the mainboard 300A. The slimline connector 34 is connected to the first M.2 connector 36 and the second M.2 connector 37. The signal connector 35 is connected to the first M.2 connector 36 and the second M.2 connector 37. For example, the slimline connector 34 and the signal connector 35 may be connected to the first M.2 connector 36 and the second M.2 connector 37 through a Y type cable, respectively. The first M.2 connector 36 and the second M.2 connector 37 may each connect a M.2 hard drive, wherein the M.2 hard drive may be configured to store a booting system. Further, the first M.2 connector 36 and the second M.2 connector 37 may support $5^{th}$ generation PICe standard and may each has four slots.

In other words, signals generated by elements on the mainboard 300A (for example, the first baseboard management controller 31 and the second baseboard management controller 32) may be output to the first M.2 connector 36 and the second M.2 connector 37 through the slimline connector 34 and the signal connector 35, thereby controlling the M.2 hard drives connected to the first M.2 connector 36 and the second M.2 connector 37 (for example, controlling the powering on of the M.2 hard drives). Specifically, the slimline connector 34 may transmit PCIe signal, standby voltage (for example, 3.3V), detection signal of indicating whether there is a M.2 hard drive and clock signals etc. to the first M.2 connector 36 and the second M.2 connector 37, respectively. Through the above structure, even if one of the M.2 connector fails, the other one may still be used to maintain the function of the server.

The temperature sensor 38 of the dual system server 3 is disposed on the M.2 backboard 300B and is connected to the signal connector 35. The temperature sensor 38 may be configured to sense a temperature corresponding to the M.2 backboard 300B. For example, the temperature sensor 38 may be configured to sense the temperature(s) of the first M.2 connector 36, the second M.2 connector 37 and/or the M.2 hard drives connected to the first M.2 connector 36 and the second M.2 connector 37. Further, the sensing result of the temperature sensor 38 may be transmitted to the first baseboard management controller 31 and the second baseboard management controller 32 through the signal connector 35.

In addition, a field replacement unit (FRU) may be further disposed on the mainboard 300A. The FRU is connected to the M.2 backboard 300B. The FRU may transmit information of the M.2 backboard 300B (for example, serial number of the M.2 backboard 300B etc.) to the mainboard 300A.

Figure 4:
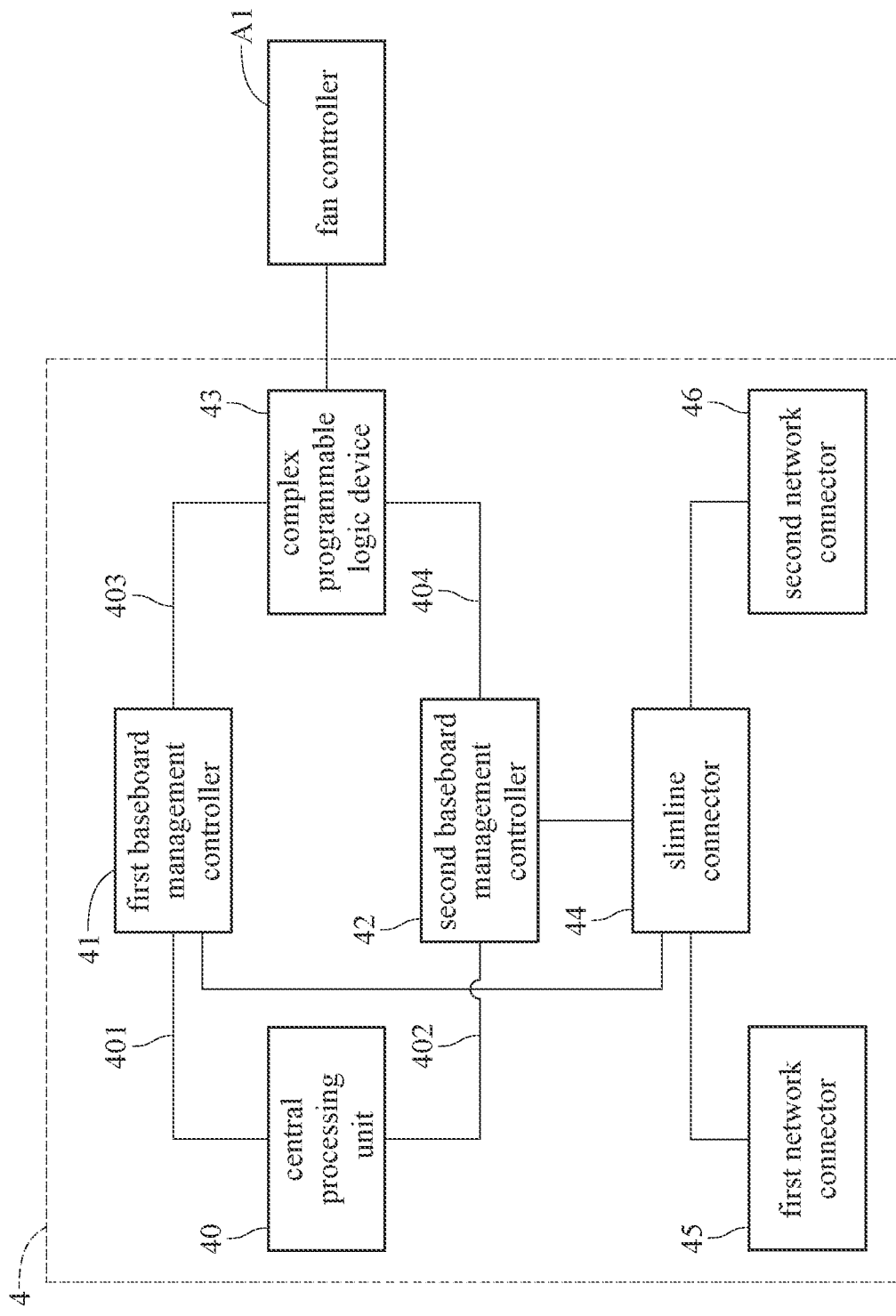
FIG. 4 is a block diagram illustrating a dual system server according to a fourth embodiment of the present disclosure.

Please refer to FIG. 4, wherein FIG. 4 is a block diagram illustrating a dual system server according to a fourth embodiment of the present disclosure. As shown in FIG. 4, the dual system server 4 includes a central processing unit 40, a first baseboard management controller 41, a second baseboard management controller 42, a complex programmable logic device 43, a slimline connector 44, a first network connector 45 and a second network connector 46.

The first baseboard management controller 41 is connected to the central processing unit 40 through the first PCIe interface 401. The second baseboard management controller 42 is connected to the central processing unit 40 through the second PCIe interface 402. The complex programmable logic device 43 is connected to the first baseboard management controller 41 through the first I2C interface 403 and connected to the second baseboard management controller 42 through the second I2C interface 404.

The central processing unit 40, the first baseboard management controller 41, the second baseboard management controller 42 and the complex programmable logic device 43 of the dual system server 4 are the same as the central processing unit 10, the first baseboard management controller 11, the second baseboard management controller 12 and the complex programmable logic device 13 of the dual system server 1, respectively, their descriptions are omitted herein.

The first baseboard management controller 41 and the second baseboard management controller 42 may be commonly connected to the slimline connector 44, wherein the slimline connector 44 is, for example, a J1 connector. The slimline connector 44 is further connected to the first network connector 45 and the second network connector 46. The first network connector 45 and the second network connector 46 may be J2 dual-socket network connector. The first network connector 45 and the second network connector 46 may each be a RJ45 network connector.

The first network connector 45 and the second network connector 46 may output the respective internet speed thereof to the slimline connector 44, and the internet speed may be output to the first baseboard management controller 41 and the second baseboard management controller 42 through the slimline connector 44. For example, the slimline connector 44 may transmit the internet speed to the FRU described above, and the FRU transmits the internet speed to the first baseboard management controller 41 and the second baseboard management controller 42.

In addition, the slimline connector 44 may be further connected to a third network connector. The third network connector may be a J2 single-socket network connector. The third network connector may be a RJ45 network connector. In addition, the slimline connector 44 may perform bidirectional communication with each one of the first network connector 45, the second network connector 46 and the third network connector. Said bidirectional communication may include transmitting medium dependent interface (MDI) signal. Through the above structure, network port functions of both single node and dual nodes may be compatible with the server, which effectively reduces the design cost of the dual system server.

Figure 5:
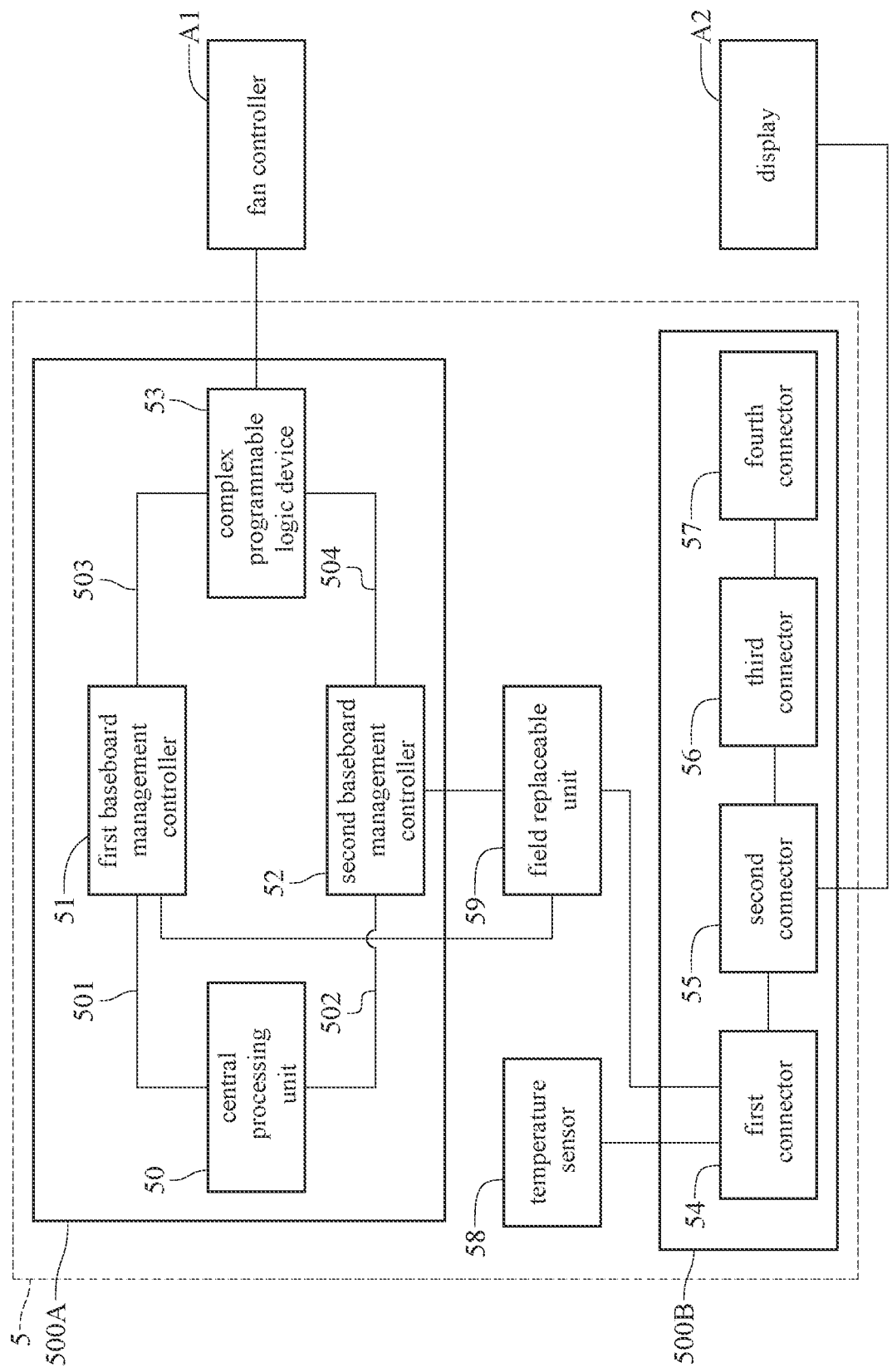
FIG. 5 is a block diagram illustrating a dual system server according to a fifth embodiment of the present disclosure.

Please refer to FIG. 5, wherein FIG. 5 is a block diagram illustrating a dual system server according to a fifth embodiment of the present disclosure. As shown in FIG. 5, the dual system server 5 includes a central processing unit 50, a first baseboard management controller 51, a second baseboard management controller 52, a complex programmable logic device 53, a first connector 54, a second connector 55, a third connector 56, a fourth connector 57, a temperature sensor 58 and a FRU 59.

The first baseboard management controller 51 is connected to the central processing unit 50 through the first PCIe interface 501. The second baseboard management controller 52 is connected to the central processing unit 50 through the second PCIe interface 502. The complex programmable logic device 53 is connected to the first baseboard management controller 51 through the first I2C interface 503 and connected to the second baseboard management controller 52 through the second I2C interface 504.

The central processing unit 50, the first baseboard management controller 51, the second baseboard management controller 52 and the complex programmable logic device 53 of the dual system server 5 are the same as the central processing unit 10, the first baseboard management controller 11, the second baseboard management controller 12 and the complex programmable logic device 13 of the dual system server 1, respectively, their descriptions are omitted herein.

As shown in FIG. 5, the dual system server 5 further includes a mainboard 500A and an ear board 500B. The central processing unit 50, the first baseboard management controller 51, the second baseboard management controller 52, the complex programmable logic device 53, the first connector 54 and the second connector 55 may all be disposed on the mainboard 500A. The first connector 54 to the fourth connector 57 may all be disposed on the ear board 500B and may be welded onto the ear board 500B in a cable-on-board manner. The first connector 54 is connected to the second connector 55, the temperature sensor 58 and the FRU 59, the second connector 55 is connected to the third connector 56 and a display A2, and the third connector 56 is connected to the fourth connector 57. In addition, the FRU 59 is further connected to the first baseboard management controller 51 and the second baseboard management controller 52. By disposing the first connector 54 to the fourth connector 57 onto the ear board 500B, the connectors may share one ear board, thereby reducing the cost of the dual system server.

The first connector 54 to the fourth connector 57 may be a J1 connector, a J2 connector, a J7 connector and a J5 connector, respectively. For example, the first connector 54 may be a MP connector, the second connector 55 may be a display port, the third connector 56 may be a slimline connector, and the fourth connector 57 may be a type C universal serial bus connector. The number of the fourth connector 57 may be one or two.

The first connector 54 and the second connector 55 may perform bidirectional communication with each other. For example, the first connector 54 and the second connector 55 may transmit video graphic array (VGA) signal to each other. In addition, the first connector 54 may be further configured to perform an inter-integrated circuit debug with the second connector 55. The third connector 56 may output communication signal to the second connector 55. The third connector 56 may be further connected to a plurality of light-emitting diodes configured to emit different colors of light representing power status, user identifier (UID) and signal status etc. The fourth connector 57 may perform bidirectional communication of universal serial bus with the third connector 56.

The temperature sensor 58 may be configured to sense a temperature of an intake opening of the ear board 500B and may output the sensed temperature to the first baseboard management controller 51 and the second baseboard management controller 52 through the first connector 54 and the FRU 59.

Figure 6:
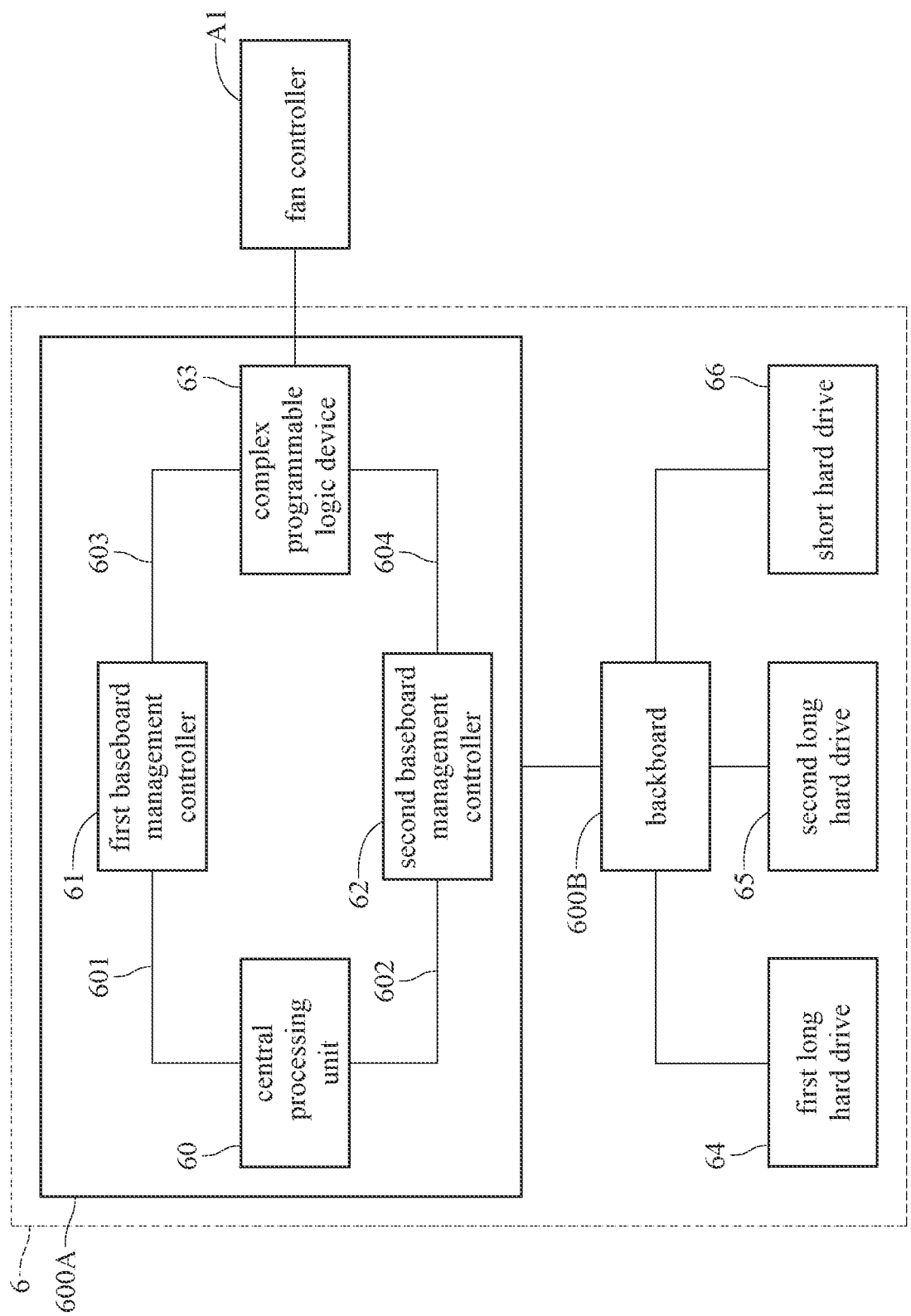
FIG. 6 is a block diagram illustrating a dual system server according to a sixth embodiment of the present disclosure.

Please refer to FIG. 6, wherein FIG. 6 is a block diagram illustrating a dual system server according to a sixth embodiment of the present disclosure. As shown in FIG. 6, the dual system server 6 includes a central processing unit 60, a first baseboard management controller 61, a second baseboard management controller 62, a complex programmable logic device 63, a first long hard drive 64, a second long hard drive 65 and a short hard drive 66.

The first baseboard management controller 61 is connected to the central processing unit 60 through the first PCIe interface 601. The second baseboard management controller 62 is connected to the central processing unit 60 through the second PCIe interface 602. The complex programmable logic device 63 is connected to the first baseboard management controller 61 through the first I2C interface 603 and is connected to the second baseboard management controller 62 through the second I2C interface 604.

The central processing unit 60, the first baseboard management controller 61, the second baseboard management controller 62 and the complex programmable logic device 63 of the dual system server 6 are the same as the central processing unit 10, the first baseboard management controller 11, the second baseboard management controller 12 and the complex programmable logic device 13 of the dual system server 1, respectively, their descriptions are omitted herein.

As shown in FIG. 6, the dual system server 6 further includes a mainboard 600A and a backboard 600B. The central processing unit 60, the first baseboard management controller 61, the second baseboard management controller 62 and the complex programmable logic device 63 may all be disposed on the mainboard 600A. The first long hard drive 64, the second long hard drive 65 and the short hard drive 66 may be connected to the backboard 600B, respectively. Specifically, the first long hard drive 64 may be connected to the backboard 600B through a third peripheral component interconnect express (PCIe) interface; the second long hard drive 65 may be connected to the backboard 600B through a fourth PCIe interface; and the short hard drive 66 may be connected to the backboard 600B through a fifth PCIe interface. Further, the backboard 600B may include three mini cool edge input/output (MCIO) connectors connected to the first long hard drive 64, the second long hard drive 65 and the short hard drive 66, respectively.

In addition, the third PCIe interface and the fourth PCIe interface may each correspond to eight slots, and the fifth PCIe interface may correspond to four slots. In other words, the first long hard drive 64 and the second long hard drive 65 may be connected to the backboard 600B through the respective eight slots, which are PCIe interfaces; and the short hard drive 66 may be connected to the backboard 600B through the four slots, which are PCIe interfaces The third PCIe interface, the fourth PCIe interface and the fifth PCIe interface may meet enterprise and data center standard form factor (EDSFF). The first long hard drive 64, the second long hard drive 65 and the short hard drive 66 may each be EDSFF hard drive. For example, the first long hard drive 64 and the second long hard drive 65 may each be an E3 long hard drive (E3.L), and the short hard drive 66 may be an E3 short hard drive (E3.S).

Through the configuration of one board disposed with both long and short hard drives, cost of the dual system server may be effectively reduced and resource utilization ratio may be improved.

It should be noted that the dual system server may also be a combination of two or more of the first embodiment to the sixth embodiment.

In view of the above description, the dual system server according to one or more embodiments of the present disclosure may implement the structure of have two one-socket (1S) servers on one mainboard, and functions of the dual systems may be compatible with the structure at the same time, thereby reducing the cost of the server. Further, the system fan may be made sure to operate normally and the situation of false hangs due to abnormal conditions may be avoided. Through the structure of multiple network connectors, network port functions of both single node and dual nodes may be compatible with the server, which effectively reduces the design cost of the dual system server. By disposed multiple connectors on the same ear board, the connectors may share one ear board, thereby reducing the cost of the dual system server. Further, through the configuration of one board disposed with both long and short hard drives, cost of the dual system server may be effectively reduced and resource utilization ratio may be improved.

What is claimed is:

1. A dual system server, comprising:
   a central processing unit;
   a first baseboard management controller connected to the central processing unit through a first peripheral component interconnect express interface;
   a second baseboard management controller connected to the central processing unit through a second peripheral component interconnect express interface;
   a complex programmable logic device connected to the first baseboard management controller through a first inter-integrated circuit interface and connected to the second baseboard management controller through a second inter-integrated circuit interface; and
   a demultiplex chip connected to the first baseboard management controller, the second baseboard management controller and the complex programmable logic device, wherein the demultiplex chip is configured to enable communication of one of the first inter-integrated circuit interface and the second inter-integrated circuit interface, and disable communication of the other one of the first inter-integrated circuit interface and the second inter-integrated circuit interface.

2. The dual system server according to claim 1, wherein the complex programmable logic device is configured to control a fan with a safe speed when any one of the first inter-integrated circuit interface and the second inter-integrated circuit interface is unreadable.

3. The dual system server according to claim 1, further comprising:
   a mainboard, wherein the central processing unit, the first baseboard management controller, the second baseboard management controller and the complex programmable logic device are disposed on the mainboard;
   a M.2 backboard connected to the mainboard;
   a slimline connector disposed on the mainboard;
   a signal connector disposed on the mainboard;
   a first M.2 connector disposed on the M.2 backboard and connected to the slimline connector and the signal connector; and
   a second M.2 connector disposed on the M.2 backboard and connected to the slimline connector and the signal connector,
   wherein the first M.2 connector and the second M.2 connector support $5^{th}$ generation peripheral component interconnect express.

4. The dual system server according to claim 3, further comprising a temperature sensor connected to the signal connector, and configured to sense a temperature of at least one of the first M.2 connector and the second M.2 connector.

5. The dual system server according to claim 1, further comprising:

a slimline connector connected to the first baseboard management controller and the second baseboard management controller;
a first network connector connected to the slimline connector; and
a second network connector connected to the slimline connector.

6. The dual system server according to claim 1, further comprising:
a field replaceable unit connected to the first baseboard management controller and the second baseboard management controller;
a first connector connected to the field replaceable unit;
a second connector connected to the first connector and a display, and configured to perform bidirectional communication of video graphic array with the first connector;
a third connector connected to the second connector, and configured to output a communication signal to the second connector; and
a fourth connector connected to the third connector, and configured to perform bidirectional communication of universal serial bus with the third connector.

7. The dual system server according to claim 6, wherein the second connector is further configured to perform an inter-integrated circuit debug with the first connector.

8. The dual system server according to claim 6, further comprising:
an ear board, wherein the first connector, the second connector, the third connector and the fourth connector are disposed on the ear board; and
a temperature sensor connected to the first connector, and configured to sense a temperature of an intake opening of the ear board.

9. The dual system server according to claim 6, further comprising:
a mainboard, wherein the central processing unit, the first baseboard management controller, the second baseboard management controller and the complex programmable logic device are disposed on the mainboard;
a backboard connected to the mainboard;
a first long hard drive configured to connect the backboard through a third peripheral component interconnect express interface;
a second long hard drive configured to connect the backboard through a fourth peripheral component interconnect express interface; and
a short hard drive configured to connect the backboard through a fifth peripheral component interconnect express interface,
wherein the third peripheral component interconnect express interface and the fourth peripheral component interconnect express interface each corresponds to eight slots, the fifth peripheral component interconnect express interface corresponds to four slots, and the third peripheral component interconnect express interface, the fourth peripheral component interconnect express interface and the fifth peripheral component interconnect express interface meet enterprise and data center standard form factor.

* * * * *